Patented Sept. 8, 1931

1,822,122

UNITED STATES PATENT OFFICE

FREDERICK W. BINNS, OF WOLLASTON, AND JOSEPH M. LURIE, OF JAMAICA PLAIN, MASSACHUSETTS, ASSIGNORS TO VIRGINIA SMELTING COMPANY, OF PORTLAND, MAINE, A CORPORATION OF MAINE

METHOD FOR MAKING BISULPHITE REACTIONS WITH SULPHUR DIOXIDE ACID SOLUTIONS

No Drawing.     Application filed December 15, 1926.   Serial No. 155,103.

This invention relates to a method for effecting the reaction of sulphur dioxide with certain chemical compounds which are characterized by a tendency to decompose, or to form intermediate reaction products which decompose, with the formation of a strong acid or acid radical.

In the course of the chemical conversion of various substances it is observed that if a relatively weak acid such as sulphurous acid s employed, an ultimate or intermediate product of the reaction may be formed which has the effect of undergoing decomposition with the formation of a relatively strong acid or acid radical which inhibits or prevents the continuation of the desired conversion reaction. On the other hand, it is sometimes found that the desired reaction may be effected with or in the presence of an acid salt, such as an alkali metal bisulphite. In practices heretofore employed, therefore, it has been customary and regarded as essential to carry out such reactions with molecular equivalents of the acid salt, even though in such practice an excess of the salt is usually necessary or desirable in addition to the equivalent quantities, and although the base or alkali content merely constitutes a waste by-product or an impurity with respect to the main product which must be separated by further treatment.

It is, therefore, an object of this invention to provide a method for effecting such reactions by the substantially direct introduction of sulphur dioxide into the reaction, either as a gas or in solution and in approximately the theoretical proportions required only. It is also an object of the invention to retard or prevent the decomposition of the reagent compound employed, during the progress of the desired reaction. Other objects will appear from the following disclosure.

The method of the invention includes generally the procedure of subjecting the sulphite reactive compound to be reacted upon to treatment in the presence of a buffer reagent (as more specifically hereinafter defined) with sulphur dioxide—preferably in aqueous solution and in predetermined regulated concentrations—under appropriate conditions to permit or cause the desired reaction to proceed to substantial completion.

By the term "sulphite-reactive compound" is to be understood any substance or compound susceptible of undergoing a desired reaction with or in the presence of an alkali metal bisulphite to effect chemical combination of sulphite or bisulphite radical therewith but which, in the presence of sulphur dioxide or sulphurous acid alone is attended by the formation of an acid stronger than sulphurous acid which arrests the further progress of the desired reaction with sulphur dioxide or sulphurous acid.

The buffer reagent employed is characterized by manifesting a lower acidity (or greater basicity) than that of the acid of decomposition and also lower than that of sulphurous acid. In other words, it may be a base or salt of which the metal or basic component will react with sulphurous acid or acids stronger than sulphurous acid to form bisulphites or corresponding salts therewith. For example, a soluble base, a salt of a weak acid or an alkali bi-sulphite may be used.

The buffer reagent accordingly, is one which operates between two acidities, the higher of which is in all cases lower than that of sulfurous acid and lower than that which interferes with or arrests the progress of the reaction. Thus, in the instance to be described, it should be lower than the acidity of naphthionic acid; if the buffer reagent be of greater acidity than naphthionic acid, the latter will be precipitated.

The recommended quantity or proportion of buffer reagent employed is such that it shall be approximately equal to or slightly in excess of that required to react with the concentration of the strong acid which may be present or tend to form at any stage of the reaction procedure.

As an instance of the practical application of the invention, it will be described with reference to its adaptation for the preparation of 1-amino-2-hydroxy-4 naphthol sulphonic acid, to which is ascribed the structural formula:

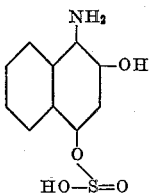

In the preparation of this compound as it is now known and practiced, betanaphthol is first converted by reaction with nitrous acid, to a nitroso compound:

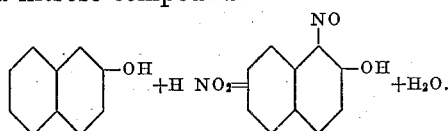

The nitroso compound is then converted to the sulphonic acid by reaction with sodium bisulphite:

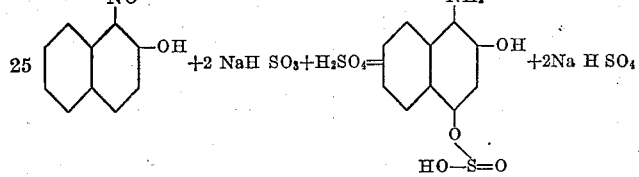

As thus carried out, two molecular equivalents of sodium bisulphite are required and the sodium content of this reagent is converted to sodium sulphate (or other form) which not only constitutes an impurity to be removed but also represents a consumption of alkali which is thus left in a form of low commercial value.

By the method of procedure in accordance with this invention the first reaction may be effected in the same or any equivalent manner. Thus, to a given charge of betanaphthol, say 50 grams, there are added 500 c. c. of a caustic soda solution containing 14 grs. NaOH into which it readily dissolves. The solution is then further diluted with 500 c. c. water, 25 grams sodium nitrite is added and ice (e. g. 500 grams) to bring the temperature to the vicinity of 5° C. or below. To the cold solution is then added 700 c. c. of 10% sulphuric acid, slowly and with continued agitation. The solution which is first white thereupon becomes green and finally orange yellow. Upon standing, the nitroso compound which is formed separates from the solution as the reaction becomes more complete.

The second reaction, however, is carried out by the addition of a buffer reagent such as sodium hydroxide or bisulphite in relatively small proportions, to the solution or suspension of nitroso compound thus prepared, followed by the introduction of sulphur dioxide gas in appropriate concentrations and amounts and under suitable conditions for the reaction to proceed substantially to completion.

To this end, the solution and suspension of the nitroso compound as above produced is neutralized with free caustic soda until alkaline toward phenolphthalein (or the free acid removed or otherwise rendered inactive) and an excess of caustic soda amounting to ¼ mol, more or less, per mol of the nitroso compound is added.

A stream of sulphur dioxide gas is now passed into the solution, (e. g. so that it is continuously absorbed) and in such ultimate quantity that the reaction is complete. This requires approximately (theoretically, exactly) two mols of sulphur dioxide for each mol of nitroso compound to be converted. The reaction solution is now permitted to stand for some time to complete the reaction. Sulphuric acid may then be added, whereupon the sulphonic acid is formed and precipitated and may be separated, as by filtration; and thus obtained in the free and substantially pure condition. Alternatively, if the solution is kept cold, the sulphur dioxide may be introduced before neutralization (in the instant case) and the caustic soda then added. With rise of temperature or after standing, the reaction commences and proceeds in the same manner as with the reverse order of adding the reagents. In either case, the alkaline or acid solution is susceptible to oxidation by contact with the air, so that conditions for the progress of the desired reaction should be instituted promptly after either the alkali or the sulphur dioxide has been added or after both are present.

By way of explanation of the results thus effected, it may be considered that the reaction take place in two stages. Of these, the first may be substantially as represented by the equation:

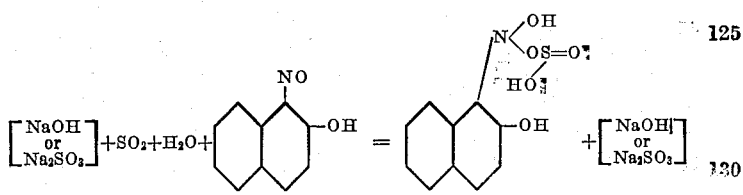

In the formation of this intermediate nitro acid compound, in the presence of an acid medium there is a certain tendency toward decomposition which is accompanied by the liberation of sulphuric acid or sulphuric acid radical. When sulphurous acid only is present this decomposition tends to retard or inhibit the further progress and completion of the reaction. The presence of the buffer reagent, however, such as sodium bisulphite, offsets or prevents this reaction either by neutralization or reduction of the sulphate radical thus tending to form so that reaction of the naphthol nucleus with sulphur dioxide or bisulphite radical continues and a high proportionate conversion is attained.

On the other hand, when the intermediate compound is once formed, the second stage of the reaction does not appear to be inhibited, by the presence of acids, but proceeds substantially to completion as represented by the following equation:

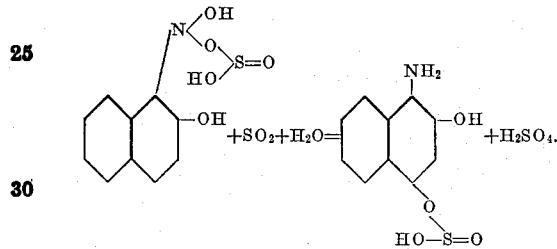

In the procedure as thus carried out the substitution of a sulphonic radical is introduced into the naphthalene nucleus, with no appreciable decomposition or formation of sulphuric acid, by the direct addition of sulphur dioxide, in the free state and under substantially weakly acid conditions in the presence of a buffer reagent, until the first stage of the reaction is substantially complete. This result is attributed to the buffer action of the intermediate sodium sulphite formed by the sulphur dioxide, water, and sodium hydroxide. The second stage of the reaction then proceeds without further difficulty, upon the continued introduction of the sulphur dioxide. Thus the process is rendered extremely simple to conduct and highly efficient with regard to reagents employed, and hence reduces the possibilities of side-reactions and contaminant by-products or unconverted starting materials.

It will be clear that the invention may be modified in many ways and adapted to many different conditions both with respect to the reagent compound used and the derivatives to be obtained therefrom and also with respect to the manner and sequence of procedure. But such modifications and adaptations are to be considered as comprehended by the above disclosure and included within the terms of the following claims.

We claim:

1. A method for the conversion of nitroso betanaphthol into a sulphur dioxide addition derivative, which comprises subjecting the same to alkalization and treating the solution with a stream of sulphur dioxide.

2. A method for the conversion of nitroso betanaphthol into its $SO_2$ addition derivative, which comprises the steps of subjecting the same to alkalization with caustic alkali and to the action of sulphur dioxide.

3. A method for the conversion of nitroso betanaphthol into a sulphur dioxide addition derivative, which comprises subjecting the same to slight alkalization and to the addition of sulphur dioxide, and promptly thereafter causing the reaction to proceed.

4. A method for the conversion of nitroso betanaphthol into a sulphur dioxide addition derivative, which comprises subjecting the same to slight alkalization and to the addition of sulphur dioxide, at low temperature, and thereafter permitting the temperature to rise and the reaction to proceed.

5. A method for the conversion of nitroso betanaphthol into its sulphonic acid derivative which comprises subjecting the same to slight alkalization, and to the action of a controlled rate of addition of sulphur dioxide, in ultimate equi-molecular quantity at low temperatures, and thereafter raising the temperature to permit the desired reaction to proceed.

6. A method for the conversion of nitroso betanaphthol into its sulphonic derivative which comprises subjecting the same to neutralization and alkalization, and to the action of a stream of sulphur dioxide in ultimate substantially equi-molecular quantities and in the presence of a buffer salt of a weak acid.

7. A method for the conversion of nitroso betanaphthol into its sulphonic derivative which comprises subjecting the former to alkalization, and to the action of molecular quantities of sulfur dioxide, added in the form of a stream and in the presence of a sodium sulphite.

Signed by us at Boston, Massachusetts, this 13th day of December, 1926.

FREDERICK W. BINNS.
JOSEPH M. LURIE.